US012606659B2

(12) United States Patent
Liu et al.

(10) Patent No.: US 12,606,659 B2
(45) Date of Patent: Apr. 21, 2026

(54) SINGLE REACTOR BIMODAL POLYETHYLENE WITH IMPROVED MODULUS FOR EXTRUSION BLOW MOLDING DRUM APPLICATIONS

(71) Applicant: Univation Technologies, LLC, Houston, TX (US)

(72) Inventors: Bo Liu, Pearland, TX (US); Shadid Askar, Houston, TX (US); Joel D. Wieliczko, Charleston, WV (US); Mridula Kapur, Lake Jackson, TX (US)

(73) Assignee: Univation Technologies, LLC, Houston, TX (US)

(*) Notice: Subject to any disclaimer, the term of this patent is extended or adjusted under 35 U.S.C. 154(b) by 623 days.

(21) Appl. No.: 18/000,220

(22) PCT Filed: May 24, 2021

(86) PCT No.: PCT/US2021/033855
§ 371 (c)(1),
(2) Date: Nov. 29, 2022

(87) PCT Pub. No.: WO2021/242678
PCT Pub. Date: Dec. 2, 2021

(65) Prior Publication Data

US 2023/0192920 A1 Jun. 22, 2023

Related U.S. Application Data

(60) Provisional application No. 63/031,712, filed on May 29, 2020.

(51) Int. Cl.

| | |
|---|---|
| ***C08F 210/16*** | (2006.01) |
| ***C08F 2/34*** | (2006.01) |
| ***C08F 4/659*** | (2006.01) |
| ***C08L 23/0807*** | (2025.01) |

(52) U.S. Cl.
CPC .............. *C08F 210/16* (2013.01); *C08F 2/34* (2013.01); *C08F 4/65912* (2013.01); *C08L 23/0815* (2013.01); *C08F 2500/05* (2013.01); *C08F 2500/07* (2013.01); *C08F 2500/12* (2013.01); *C08F 2500/13* (2013.01); *C08L 2205/02* (2013.01); *C08L 2207/062* (2013.01)

(58) Field of Classification Search
CPC .......................... C08F 210/16; C08F 2500/05; C08F 2500/07; C08F 2500/12; C08F 2500/13; C08L 23/0815
See application file for complete search history.

(56) References Cited

U.S. PATENT DOCUMENTS

| | | | |
|---|---|---|---|
| 3,709,853 | A | 1/1973 | Karapinka |
| 4,003,712 | A | 1/1977 | Miller |
| 4,011,382 | A | 3/1977 | Levine et al. |
| 4,302,566 | A | 11/1981 | Karol et al. |
| 4,480,075 | A | 10/1984 | Willis |
| 4,543,399 | A | 9/1985 | Jenkins, III et al. |
| 4,665,208 | A | 5/1987 | Welborn, Jr. et al. |
| 4,874,734 | A | 10/1989 | Kioka et al. |
| 4,882,406 | A | 11/1989 | Cozewith et al. |
| 4,882,440 | A | 11/1989 | Hrib |
| 4,908,463 | A | 3/1990 | Bottelberghe |
| 4,924,018 | A | 5/1990 | Bottelberghe |
| 4,952,540 | A | 8/1990 | Kioka et al. |

(Continued)

FOREIGN PATENT DOCUMENTS

| | | | |
|---|---|---|---|
| EP | 0279586 | B1 | 5/1994 |
| EP | 0517868 | B1 | 11/1995 |

(Continued)

OTHER PUBLICATIONS

Chinese Office Action and Search Report dated Mar. 18, 2024, pertaining to CN Patent Application No. 202180037751.9, 12 pgs.
Chinese Office Action dated Nov. 27, 2024, pertaining to CN Patent Application No. 202180037751.9, 6 pgs.
Moore "Polypropylene Handbook," at pp. 76-78 (Hanser Publishers, 1996).
Baumann et al. "Synthesis of Titanium and Zirconium Complexes that Contain the Tridentate Diamido Ligand, [((t-Bu-d)N-o-C6H4 ) 2 oJ'-( {NON}2 -) and the Living Polymerization of 1-Hexene by Activated [NON]ZrMe2", J. Am. Chem. Soc. 1997, 119, 3830-3831.
Clark et al. "Titanium(IV) complexes incorporating the aminodiamide ligand [ (SiMe3)N { CH2CH2N(SiMe3)} 2 ] 2-(L); the X-ray crystal structures of [TiMeiL)] and [Ti Cl { CH(SiMe3 ) 2 }(L) ]", Journal of Organometallic Chemistry, vol. 501, pp. 333-340, 1995.
Cloke et al. "Zirconium Complexes incorporating the New Tridentate Diamide Ligand [(Me3Si)N { CH2CH2N (SiMe3) } 2 ] 2-(L); the Crystal Structures of [Zr(BH4 ) 2L] and [ZrCl { CH(SiMe3 ) 2 } L ]", J. Chem . Soc. Dalton Trans., pp. 25-30, 1995.

(Continued)

*Primary Examiner* — Rip A Lee
(74) *Attorney, Agent, or Firm* — Dinsmore & Shohl LLP

(57) ABSTRACT

In various embodiments, a bimodal polyethylene composition may have a density (ρ) from 0.952 $g/cm^3$ to 0.957 $g/cm^3$, a high load melt index ($I_{21}$) from 1 to 10 dg/min, and a z-average molecular weight ($M_{z(GPC)}$) from 3,200,000 to 5,000,000 g/mol. The bimodal polyethylene composition may also have a peak molecular weight ($M_{p(GPC)}$) defined by the equation: $M_{p(GPC)}<-2,805.3$ MWD+102,688, wherein MWD is a molecular weight distribution defined by the equation: MWD=$M_{w(GPC)}/M_{n(GPC)}$, $M_{w(GPC)}$ is a weight average molecular weight of the bimodal polyethylene composition, $M_{n(GPC)}$ is a number average molecular weight of the bimodal polyethylene composition. Additionally, the bimodal polyethylene composition has a ratio of the (Mz (GPC)) to the Mw(GPC) from 8.5 to 10.5. Articles made from the bimodal polyethylene composition, such as articles made by blow molding processes, are also provided.

17 Claims, No Drawings

(56) References Cited

U.S. PATENT DOCUMENTS

| | | | | |
|---|---|---|---|---|
| 4,968,827 | A | 11/1990 | Davis | |
| 5,041,584 | A | 8/1991 | Crapo et al. | |
| 5,091,352 | A | 2/1992 | Kioka et al. | |
| 5,103,031 | A | 4/1992 | Smith, Jr. | |
| 5,157,137 | A | 10/1992 | Sangokoya | |
| 5,196,491 | A | 3/1993 | Cho et al. | |
| 5,204,419 | A | 4/1993 | Tsutsui et al. | |
| 5,206,199 | A | 4/1993 | Kioka et al. | |
| 5,235,081 | A | 8/1993 | Sangokoya | |
| 5,248,801 | A | 9/1993 | Sangokoya | |
| 5,281,368 | A | 1/1994 | Dias et al. | |
| 5,329,032 | A | 7/1994 | Tran et al. | |
| 5,352,749 | A | 10/1994 | DeChellis et al. | |
| 5,391,629 | A | 2/1995 | Turner et al. | |
| 5,399,626 | A | 3/1995 | Erickson et al. | |
| 5,422,409 | A | 6/1995 | Brekner et al. | |
| 5,427,991 | A | 6/1995 | Turner | |
| 5,438,102 | A | 8/1995 | Brandes et al. | |
| 5,473,202 | A | 12/1995 | Mudge et al. | |
| 5,476,915 | A | 12/1995 | Shea et al. | |
| 5,489,651 | A | 2/1996 | Novak et al. | |
| 5,541,270 | A | 7/1996 | Chinh et al. | |
| 5,602,219 | A | 2/1997 | Aulbach et al. | |
| 5,610,253 | A | 3/1997 | Hatke et al. | |
| 5,612,428 | A | 3/1997 | Winter et al. | |
| 5,648,310 | A | 7/1997 | Wasserman et al. | |
| 5,665,818 | A | 9/1997 | Tilston et al. | |
| 5,677,375 | A | 10/1997 | Rifi et al. | |
| 5,688,880 | A | 11/1997 | Spencer et al. | |
| 5,693,730 | A | 12/1997 | Kuber et al. | |
| 5,698,645 | A | 12/1997 | Weller et al. | |
| 5,741,868 | A | 4/1998 | Winter et al. | |
| 5,770,755 | A | 6/1998 | Schertl et al. | |
| 5,789,474 | A | 8/1998 | Lu et al. | |
| 5,889,128 | A | 3/1999 | Schrock et al. | |
| 5,965,477 | A | 10/1999 | Sivaram et al. | |
| 5,972,510 | A | 10/1999 | O'Hare et al. | |
| 6,034,187 | A | 3/2000 | Maehama et al. | |
| 6,472,484 | B1 | 10/2002 | Abe et al. | |
| 7,868,092 | B2 | 1/2011 | Kwalk et al. | |
| 8,501,882 | B2 * | 8/2013 | Ding | C08F 10/00 526/348 |
| 8,680,218 | B1 * | 3/2014 | Yang | C08F 210/16 526/86 |
| 8,865,846 | B2 * | 10/2014 | Ding | C08F 10/00 526/348 |
| 8,957,168 | B1 * | 2/2015 | Yang | C08F 4/649 526/348 |
| 9,006,367 | B2 * | 4/2015 | McDaniel | C08J 5/18 526/348 |
| 9,034,991 | B2 * | 5/2015 | Hlavinka | C08F 210/16 526/348 |
| 9,156,970 | B2 * | 10/2015 | Hlavinka | C08F 210/02 |
| 9,169,337 | B2 * | 10/2015 | Rohatgi | C08F 10/08 |
| 9,178,907 | B2 * | 11/2015 | Kashyap | H04L 63/1416 |
| 9,273,170 | B2 * | 3/2016 | Hlavinka | C08L 23/0815 |
| 9,303,110 | B2 * | 4/2016 | Greco | C08F 210/16 |
| 9,493,589 | B1 * | 11/2016 | Greco | C08L 23/0815 |
| 9,505,161 | B2 * | 11/2016 | Sun | C08F 10/02 |
| 9,540,457 | B1 * | 1/2017 | Ding | B01J 37/024 |
| 9,550,849 | B2 * | 1/2017 | Hlavinka | C08F 210/16 |
| 9,758,599 | B2 * | 9/2017 | Ding | C08F 4/6457 |
| 9,845,367 | B2 * | 12/2017 | Ding | C08F 210/16 |
| 10,358,506 | B2 * | 7/2019 | Ding | C08F 4/6192 |
| 10,961,331 | B2 * | 3/2021 | Small | C08F 4/7034 |
| 11,028,258 | B2 * | 6/2021 | Tso | C08F 210/16 |
| 11,124,586 | B1 * | 9/2021 | McDaniel | C08J 5/18 |
| 11,267,919 | B2 * | 3/2022 | Praetorius | B29C 49/0005 |
| 11,339,279 | B2 * | 5/2022 | Ding | C08J 5/18 |
| 11,377,541 | B2 * | 7/2022 | Cruz | C08F 4/65916 |
| 11,578,156 | B2 * | 2/2023 | Praetorius | C08F 210/16 |
| 11,667,777 | B2 * | 6/2023 | Lief | C08F 4/65912 526/160 |
| 11,685,798 | B2 * | 6/2023 | Martin | C08F 4/65922 526/352 |
| 12,330,362 | B2 * | 6/2025 | Liu | B29C 48/92 |
| 2022/0162358 | A1 * | 5/2022 | Askar | C08F 210/16 |
| 2022/0169762 | A1 * | 6/2022 | Askar | C07F 17/00 |

FOREIGN PATENT DOCUMENTS

| | | | | |
|---|---|---|---|---|
| EP | 0511665 B1 | 7/1998 | | |
| EP | 0561476 B1 | 1/1999 | | |
| EP | 0893454 A1 | 1/1999 | | |
| EP | 0594218 B1 | 3/1999 | | |
| EP | 0767184 B1 | 8/1999 | | |
| EP | 0802202 B1 | 10/1999 | | |
| EP | 0794200 B1 | 7/2000 | | |
| EP | 0802203 B1 | 9/2001 | | |
| JP | 8081415 A | 3/1996 | | |
| WO | 1991012285 A1 | 8/1991 | | |
| WO | 1992012162 A1 | 7/1992 | | |
| WO | 1994010180 A1 | 5/1994 | | |
| WO | 1997042197 A1 | 11/1997 | | |
| WO | 1999047598 A1 | 9/1999 | | |
| WO | 1999048605 A1 | 9/1999 | | |
| WO | 1999050311 A1 | 10/1999 | | |
| WO | 1999060033 A1 | 11/1999 | | |
| WO | 2018147968 A1 | 8/2018 | | |
| WO | WO 2020028059 A1 | 2/2020 | * | C08F 210/16 |
| WO | 2020223191 A1 | 11/2020 | | |

OTHER PUBLICATIONS

Guerin et al. "Conformationally Rigid Diamide Complexes: Synthesis and Structure of Titanium(IV) Alkyl Derivatives", Organometallics, vol. 15., No. 24, pp. 5085-5089, 1996.

Horton et al. "Cationic Alkylzirconium Complexes Based on a Tridentate Diamide Ligand: New Alkene Polymerization Catalysts", Organometallics, vol. 15, No. 12, pp. 2672-2674, 1996.

Scollard et al. "Living Polymerization of a-Olefins by Chelating Diamide Complexes of Titanium", J. Am. Chem. Soc., vol. 118, No. 41, pp. 10008-10009, 1996.

Sceirs et al. vol. 2, "Metallocene-Based Polyolefins," at pp. 366-378 (John Scheirs & W. Kaminsky, eds. John Wiley & Sons, Ltd. 2000).

Saudi Arabian First Substantive Examination Report dated Aug. 3, 2025, pertaining to SA Patent Application No. 522441421.1, 6 pgs.

International Search Report and Written Opinion dated Sep. 13, 2021, pertaining to Int'l Patent Application No. PCT/US2021/033855, 9 pgs.

Williams et al. "The Construction of a Polyethylene Calibration Curve for Gel Permeation Chromatography Using Polystyrene Fractions", Polymer Letters, vol. 6, pp. 621-624 (1968).

Brazil Office Action dated Mar. 18, 2025, pertaining to BR Patent Appliation No. 112022023951.3, 4 pgs.

European Article 94(3) dated May 14, 2024, pertaining to EP Patent Application No. 21733870.6, 5 pgs.

Korean Office Action dated Jan. 15, 2026, pertaining to KR Patent Application No. 10-2022-7044853, 13 pgs.

India Office Action dated Jan. 16, 2026, pertaining to IN Patent Application No. 202217068459, 7 pgs.

Communication pursuant to Article 94(3) EPC dated Feb. 25, 2026, pertaining to EP Patent Application No. 21733870.6, 4 pgs.

Panchenko et al. "Copolymerization of Ethylene with a-Olefins Initiated by Supported Zirconium and Hafnium Hydride Catalysts", Polymer Science, Interperiodica, Birmingham, AL, US, Series A, vol. 36, No. 1, Jan. 1994, pp. 1-5.

Canadian Office Action dated Mar. 11, 2026, pertaining to CA Patent Application No. 3180272, 4 pgs.

* cited by examiner

SINGLE REACTOR BIMODAL POLYETHYLENE WITH IMPROVED MODULUS FOR EXTRUSION BLOW MOLDING DRUM APPLICATIONS

CROSS-REFERENCE TO RELATED APPLICATIONS

This application is a National Phase Entry under 35 U.S.C. § 371 of International Patent Application No. PCT/US2021/033855 filed May 24, 2021, which claims priority to U.S. Provisional Patent Application Ser. No. 63/031,712 filed May 29, 2020, which is incorporated by reference in its entirety.

TECHNICAL FIELD

Embodiments of the present disclosure are generally directed to polymer compositions and, in particular, bimodal polyethylene compositions and articles comprising bimodal polyethylene compositions that have improved performance and processability.

BACKGROUND

In manufacturing molded articles, such as plastic closure devices and plastic containers, both the performance and the processability of the polymer used for the manufacture of molded articles is critical in order to ensure success in both the fabrication and utilization of the molded article. For example, the environmental stress cracking resistance (ESCR) of a molded article is critical to prevent an uncontrolled release of the container materials, but the molded article should also possess adequate stiffness, demonstrated by modulus, to prevent deformation when stacked during transportation and storage. Typically, a polymer having a relatively higher density, such as a high density polyethylene (HDPE), is used for the manufacture of molded articles to achieve adequate stiffness. While stiffness may increase as the density of the polymer increases, the processability of the polymer and the ESCR of the resulting molded article may decrease. Accordingly, there is an ongoing need for polymer compositions that balance performance and processability by achieving an adequate stiffness while also maintaining adequate ESCR and processability.

SUMMARY

Embodiments of the present disclosure address these needs by providing a bimodal polyethylene composition, which may have a density (ρ) from 0.952 grams per cubic centimeter (g/cm$^3$) to 0.957 g/cm$^3$ when measured according to ASTM D792-08, Method B, a high load melt index ($I_{21}$) from 1.0 to 10 decigrams per minute (dg/min) when measured according to ASTM D1238 at 190 degrees Celsius (° C.) and a 21.6 kilogram (kg) load, and a z-average molecular weight ($M_{z(GPC)}$) from 3,200,000 to 5,000,000 g/mol as measured using gel permeation chromatography (GPC). The bimodal polyethylene composition may also have a peak molecular weight ($M_{p(GPC)}$) defined by the equation: $M_{p(GPC)}<-2,805.3\times MWD+102,688$, wherein MWD is a molecular weight distribution defined by the equation: $MWD=M_{w(GPC)}/M_{n(GPC)}$, $M_{w(GPC)}$ is a weight average molecular weight of the bimodal polyethylene composition, $M_{n(GPC)}$ is a number average molecular weight of the bimodal polyethylene composition, and $M_{p(GPC)}$, $M_{w(GPC)}$, and $M_{n(GPC)}$ are measured using GPC. Additionally, the bimodal polyethylene composition has a ratio of the (Mz (GPC)) to the Mw(GPC) from 8.5 to 10.5.

These and additional features provided by the embodiments of the present disclosure will be more fully understood in view of the following detailed description, in conjunction with the drawings.

DETAILED DESCRIPTION

Embodiments of the present disclosure are directed to bimodal polyethylene compositions and articles comprising bimodal polyethylene compositions that have improved performance and processability. Embodiments of the present disclosure are directed to a bimodal polyethylene composition, which may have a density (ρ) from 0.952 g/cm$^3$ to 0.957 g/cm$^3$ when measured according to ASTM D792-08, Method B, a high load melt index ($I_{21}$) from 1.0 to 10 dg/min when measured according to ASTM D1238 at 190° C. and a 21.6 kg load, and a z-average molecular weight ($M_{z(GPC)}$) greater than 3,200,000 g/mol as measured using gel permeation chromatography (GPC). The bimodal polyethylene composition may also have a peak molecular weight ($M_{p(GPC)}$) defined by the equation: $M_{p(GPC)}<-2,805.3\times MWD+102,688$, wherein MWD is a molecular weight distribution defined by the equation: $MWD=M_{w(GPC)}/M_{n(GPC)}$, $M_{w(GPC)}$ is a weight average molecular weight of the bimodal polyethylene composition, $M_{n(GPC)}$ is a number average molecular weight of the bimodal polyethylene composition, and $M_{p(GPC)}$, $M_{w(GPC)}$, and $M_{n(GPC)}$ are measured using GPC.

The term "polymer" refers to polymeric compounds prepared by polymerizing monomers, whether of the same or a different type. The generic term polymer thus embraces the term "homopolymer," which is usually employed to refer to polymers prepared from only one type of monomer, and the term "copolymer," which is usually employed to refer to polymers prepared from two or more different monomers.

The term "interpolymer" refers to polymers prepared by polymerizing at least two different types of monomers. The generic term interpolymer thus includes copolymers and other polymers prepared by polymerizing more than two different types of monomers, such as terpolymers.

The terms "polyethylene" and "ethylene-based polymer" refer to polymers comprising greater than 50 percent (%) by mole of units that have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); Medium Density Polyethylene (MDPE); and High Density Polyethylene (HDPE).

The term "multimodal" refers to compositions that can be characterized by having at least two polymer fractions with varying densities, weight averaged molecular weights, and, optionally, melt index values. Multimodal compositions can also be characterized by having at least two distinct peaks in a gel permeation chromatography (GPC) chromatogram depicting the molecular weight distribution of the composition. The generic term multimodal thus embraces the term "bimodal," which refers to compositions having two primary fractions: a first ethylene-based polymer fraction, which may be a low molecular weight fraction, and a second ethylene-based polymer fraction, which may be a high molecular weight fraction; and the term "trimodal," which refers to compositions having three primary fractions: a first ethylene-based polymer fraction, a second ethylene-based polymer fraction, and a third ethylene-based polymer fraction.

The terms "polyolefin," "polyolefin polymer," and "polyolefin resin" refer to a polymer produced from a simple olefin (also called an alkene with the general formula $C_nH_{2n}$) as a monomer. Polyethylene is produced by polymerizing ethylene with or without one or more comonomers, polypropylene by polymerizing propylene with or without one or more comonomers, and the like. Thus, polyolefins include interpolymers such as ethylene-alpha-olefin copolymers, propylene-alpha-olefin copolymers, and the like.

The term "composition," as used herein, refers to a mixture of materials that comprises the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Notations used in the equations included herein refer to their standard meaning as understood in the field of mathematics. For example, "=" means equal to, "×" denotes the multiplication operation, "+" denotes the addition operation, "−" denotes the subtraction operation, ">" is a "greater than" sign, "<" is a "less than" sign, "and "/" denotes the division operation.

Embodiments of the bimodal polyethylene composition may be a polymerized reaction product of an ethylene monomer and at least one $C_3$-$C_{12}$ α-olefin comonomer. For example, embodiments of the bimodal polyethylene composition may be a polymerized reaction product of an ethylene monomer and 1-butene, 1-hexene, or both. Alternatively, embodiments of the bimodal polyethylene composition may be a polymerized reaction product of an ethylene monomer and 1-butene, 1-octene, or both. Embodiments of the bimodal polyethylene may also be a polymerized reaction product of an ethylene monomer and 1-hexene, 1-octene, or both. In some embodiments, the $C_3$-$C_{12}$ α-olefin comonomer may not be propylene. That is, the at least one $C_3$-$C_{12}$ α-olefin comonomer may be substantially free of propylene. The term "substantially free" of a compound means the material or mixture comprises less than 1.0 wt. % of the compound. For example, the at least one $C_3$-$C_{12}$ α-olefin comonomer, which may be substantially free of propylene, may comprise less than 1.0 wt. % propylene, such as less than 0.8 wt. % propylene, less than 0.6 wt. % propylene, less than 0.4 wt. % propylene, or less than 0.2 wt. % propylene.

Embodiments of the bimodal polyethylene composition may have a density greater than or equal to 0.952 g/cm$^3$ when measured according to ASTM D792-08, Method B. For example, embodiments of the bimodal polyethylene composition may have a density greater than or equal to 0.953 g/cm$^3$, greater than or equal to 0.954 g/cm$^3$, greater than or equal to 0.955 g/cm$^3$, or greater than or equal to 0.956 g/cm$^3$ when measured according to ASTM D792-08, Method B. Embodiments of the bimodal polyethylene composition may also have a density less than or equal to 0.957 g/cm$^3$ when measured according to ASTM D792-08, Method B. For example, embodiments of the bimodal polyethylene composition may also have a density less than or equal to 0.956 g/cm$^3$, less than or equal to 0.955 g/cm$^3$, less than or equal to 0.954 g/cm$^3$, or less than or equal to 0.953 g/cm$^3$ when measured according to ASTM D792-08, Method B. In embodiments, the bimodal polyethylene composition may have a density of from 0.952 g/cm$^3$ to 0.957 g/cm$^3$ when measured according to ASTM D792-08, Method B. For example, embodiments of the bimodal polyethylene composition may have a density of from 0.952 g/cm$^3$ to 0.956 g/cm$^3$, from 0.952 g/cm$^3$ to 0.955 g/cm$^3$, from 0.952 g/cm$^3$ to 0.954 g/cm$^3$, from 0.952 g/cm$^3$ to 0.953 g/cm$^3$, from 0.953 g/cm$^3$ to 0.957 g/cm$^3$, from 0.953 g/cm$^3$ to 0.956 g/cm$^3$, from 0.953 g/cm$^3$ to 0.955 g/cm$^3$, from 0.953 g/cm$^3$ to 0.954 g/cm$^3$, from 0.954 g/cm$^3$ to 0.957 g/cm$^3$, from 0.954 g/cm$^3$ to 0.956 g/cm$^3$, from 0.954 g/cm$^3$ to 0.955 g/cm$^3$, from 0.955 g/cm$^3$ to 0.957 g/cm$^3$, from 0.955 g/cm$^3$ to 0.956 g/cm$^3$, or from 0.956 g/cm$^3$ to 0.957 g/cm$^3$ when measured according to ASTM D792-08, Method B.

Embodiments of the bimodal polyethylene composition may have a high load melt index ($I_{21}$) greater than or equal to 1.0 dg/min when measured according to ASTM D1238 at 190° C. and a 21.6 kg load. For example, embodiments of the bimodal polyethylene composition may have a high load melt index ($I_{21}$) greater than or equal to 1.0 dg/min, greater than or equal to 4.0 dg/min, or greater than or equal to 7.0 dg/min when measured according to ASTM D1238 at 190° C. and a 21.6 kg load. Embodiments of the bimodal polyethylene composition may also have a high load melt index ($I_{21}$) less than or equal to 10 dg/min when measured according to ASTM D1238 at 190° C. and a 21.6 kg load. For example, embodiments of the bimodal polyethylene composition may have a high load melt index ($I_{21}$) less than or equal to 10 dg/min, less than or equal to 7.0 dg/min, or less than or equal to 4.0 dg/min when measured according to ASTM D1238 at 190° C. and a 21.6 kg load. In embodiments, the bimodal polyethylene composition may have a high load melt index ($I_{21}$) of from 1.0 dg/min to 10 dg/min when measured according to ASTM D1238 at 190° C. and a 21.6 kg load. For example, embodiments of the bimodal polyethylene composition may have a high load melt index ($I_{21}$) of from 1.0 dg/min to 7.0 dg/min, from 1.0 dg/min to 4.0 dg/min, from 4.0 dg/min to 10 dg/min, from 4.0 dg/min to 7.0 dg/min, or from 7.0 dg/min to 10 dg/min when measured according to ASTM D1238 at 190° C. and a 21.6 kg load.

Embodiments of the bimodal polyethylene composition may have a melt flow ratio ($MFR_5$) greater than 20. The term "$MFR_5$" refers to a ratio of melt indices and, in particular, a ratio of the high load melt index ($I_{21}$) to a ratio of a melt index ($I_5$) of the bimodal polyethylene measured according to ASTM D1238 at 190° C. and a 5.0 kg load. For example, embodiments of the bimodal polyethylene composition may have a $MFR_5$ greater than 22, greater than 24, greater than 26, greater than 28, or greater than 30. Embodiments of the bimodal polyethylene may also have a $MFR_5$ less than 32. For example, embodiments of the bimodal polyethylene composition may have a $MFR_5$ less than 30, less than 28, less than 26, less than 24, or less than 22. In some embodiments, the bimodal polyethylene composition may have a $MFR_5$ of from 20 to 32. For example, embodiments of the bimodal polyethylene composition may have a $MFR_5$ of from 20 to 30, from 20 to 28, from 20 to 26, from 20 to 24, from 20 to 22, from 22 to 32, from 22 to 30, from 22 to 28, from 22 to 26, from 22 to 24, from 24 to 32, from 24 to 30, from 24 to 28, from 24 to 26, from 26 to 32, from 26 to 30, from 26 to 28, from 28 to 32, from 28 to 30, or from 30 to 32.

Embodiments of the bimodal polyethylene composition may have a z-average molecular weight ($M_{z(GPC)}$) greater than 3,200,000 g/mol as measured using gel permeation chromatography (GPC). For example, embodiments of the bimodal polyethylene composition may have a z-average molecular weight ($M_{z(GPC)}$) greater than 3,400,000 g/mol, greater than 3,600,000 g/mol, greater than 3,800,000 g/mol, greater than 4,000,000 g/mol, greater than 4,200,000 g/mol, greater than 4,400,000 g/mol, greater than 4,600,000 g/mol, or greater than 4,800,000 g/mol as measured using gel permeation chromatography (GPC). Embodiments of the bimodal polyethylene composition may also have a z-average molecular weight ($M_{z(GPC)}$) less than 5,000,000 g/mol as measured using gel permeation chromatography (GPC). For example, embodiments of the bimodal polyethylene composition may have a z-average molecular weight ($M_{z(GPC)}$) less than 4,800,000 g/mol, less than 4,600,000 g/mol, less than 4,400,000 g/mol, less than 4,200,000 g/mol, less than 4,000,000 g/mol, less than 3,800,000 g/mol, less than 3,600,000 g/mol, or less than 3,400,000 g/mol as measured using gel permeation chromatography (GPC). In embodiments, the bimodal polyethylene composition may have a z-average molecular weight ($M_{z(GPC)}$) of from 3,200,000 g/mol to 5,000,000 g/mol as measured using gel permeation chromatography (GPC). For example, embodiments of the bimodal polyethylene composition may have a z-average molecular weight ($M_{z(GPC)}$) of from 3,200,000 g/mol to 4,800,000 g/mol, from 3,200,000 g/mol to 4,600,000 g/mol, from 3,200,000 g/mol to 4,400,000 g/mol, from 3,200,000 g/mol to 4,200,000 g/mol, from 3,200,000 g/mol to 4,000,000 g/mol, from 3,200,000 g/mol to 3,800,000 g/mol, from 3,200,000 g/mol to 3,600,000 g/mol, from 3,200,000 g/mol to 3,400,000 g/mol, from 3,400,000 g/mol to 5,000,000 g/mol, from 3,400,000 g/mol to 4,800,000 g/mol, from 3,400,000 g/mol to 4,600,000 g/mol, from 3,400,000 g/mol to 4,400,000 g/mol, from 3,400,000 g/mol to 4,200,000 g/mol, from 3,400,000 g/mol to 4,000,000 g/mol, from 3,400,000 g/mol to 3,800,000 g/mol, from 3,400,000 g/mol to 3,600,000 g/mol, from 3,600,000 g/mol to 5,000,000 g/mol, from 3,600,000 g/mol to 4,800,000 g/mol, from 3,600,000 g/mol to 4,600,000 g/mol, from 3,600,000 g/mol to 4,400,000 g/mol, from 3,600,000 g/mol to 4,200,000 g/mol, from 3,600,000 g/mol to 4,000,000 g/mol, from 3,600,000 g/mol to 3,800,000 g/mol, from 3,800,000 g/mol to 5,000,000 g/mol, from 3,800,000 g/mol to 4,800,000 g/mol, from 3,800,000 g/mol to 4,600,000 g/mol, from 3,800,000 g/mol to 4,400,000 g/mol, from 3,800,000 g/mol to 4,200,000 g/mol, from 3,800,000 g/mol to 4,000,000 g/mol, from 4,000,000 g/mol to 5,000,000 g/mol, from 4,000,000 g/mol to 4,800,000 g/mol, from 4,000,000 g/mol to 4,600,000 g/mol, from 4,000,000 g/mol to 4,400,000 g/mol, from 4,000,000 g/mol to 4,200,000 g/mol, from 4,200,000 g/mol to 5,000,000 g/mol, from 4,200,000 g/mol to 4,800,000 g/mol, from 4,200,000 g/mol to 4,600,000 g/mol, from 4,200,000 g/mol to 4,400,000 g/mol, from 4,400,000 g/mol to 5,000,000 g/mol, from 4,400,000 g/mol to 4,800,000 g/mol, from 4,400,000 g/mol to 4,600,000 g/mol, from 4,600,000 g/mol to 5,000,000 g/mol, from 4,600,000 g/mol to 4,800,000 g/mol, or from 4,800,000 g/mol to 5,000,000 g/mol as measured using gel permeation chromatography (GPC).

Embodiments of the bimodal polyethylene composition may have a number average molecular weight ($M_{n(GPC)}$) greater than 28,000 g/mol as measured using gel permeation chromatography (GPC). For example, embodiments of the bimodal polyethylene composition may have a number average molecular weight ($M_{n(GPC)}$) greater than 30,000 g/mol, greater than 32,000 g/mol, greater than 34,000 g/mol, greater than 36,000 g/mol, or greater than 38,000 g/mol as measured using gel permeation chromatography (GPC). Embodiments of the bimodal polyethylene composition may also have a number average molecular weight ($M_{n(GPC)}$) less than 40,000 g/mol as measured using gel permeation chromatography (GPC). For example, embodiments of the bimodal polyethylene composition may have a number average molecular weight ($M_{n(GPC)}$) less than 38,000 g/mol, less than 36,000 g/mol, less than 34,000 g/mol, less than 32,000 g/mol, or less than 30,000 g/mol as measured using gel permeation chromatography (GPC). In embodiments, the bimodal polyethylene composition may have a number average molecular weight ($M_{n(GPC)}$) of from 28,000 g/mol to 40,000 g/mol as measured using gel permeation chromatography (GPC). For example, embodiments of the bimodal polyethylene composition may have a number average molecular weight ($M_{n(GPC)}$) of from 28,000 g/mol to 38,000 g/mol, from 28,000 g/mol to 36,000 g/mol, from 28,000 g/mol to 34,000 g/mol, from 28,000 g/mol to 32,000 g/mol, from 28,000 g/mol to 30,000 g/mol, from 30,000 g/mol to 40,000 g/mol, from 30,000 g/mol to 38,000 g/mol, from 30,000 g/mol to 36,000 g/mol, from 30,000 g/mol to 34,000 g/mol, from 30,000 g/mol to 32,000 g/mol, from 32,000 g/mol to 40,000 g/mol, from 32,000 g/mol to 38,000 g/mol, from 32,000 g/mol to 36,000 g/mol, from 32,000 g/mol to 34,000 g/mol, from 34,000 g/mol to 40,000 g/mol, from 34,000 g/mol to 38,000 g/mol, from 34,000 g/mol to 36,000 g/mol, from 36,000 g/mol to 40,000 g/mol, from 36,000 g/mol to 38,000 g/mol, or from 38,000 g/mol to 40,000 g/mol as measured using gel permeation chromatography (GPC).

Embodiments of the bimodal polyethylene composition may have a weight average molecular weight ($M_{w(GPC)}$) greater than 380,000 g/mol as measured using gel permeation chromatography (GPC). For example, embodiments of the bimodal polyethylene composition may have a weight average molecular weight ($M_{w(GPC)}$) greater than 400,000 g/mol, greater than 420,000 g/mol, greater than 440,000 g/mol, greater than 460,000 g/mol, or greater than 480,000 g/mol as measured using gel permeation chromatography (GPC). Embodiments of the bimodal polyethylene composition may also have a weight average molecular weight ($M_{w(GPC)}$) less than 500,000 g/mol as measured using gel permeation chromatography (GPC). For example, embodiments of the bimodal polyethylene composition may have a weight average molecular weight ($M_{w(GPC)}$) less than 480,000 g/mol, less than 460,000 g/mol, less than 440,000 g/mol, less than 420,000 g/mol, or less than 400,000 g/mol as measured using gel permeation chromatography (GPC). In embodiments, the bimodal polyethylene composition may have a weight average molecular weight ($M_{w(GPC)}$) of from 380,000 g/mol to 500,000 g/mol as measured using gel permeation chromatography (GPC). For example, embodiments of the bimodal polyethylene composition may have a weight average molecular weight ($M_{w(GPC)}$) of from 380,000 g/mol to 480,000 g/mol, from 380,000 g/mol to 460,000 g/mol, from 380,000 g/mol to 440,000 g/mol, from 380,000 g/mol to 420,000 g/mol, from 380,000 g/mol to 400,000 g/mol, from 400,000 g/mol to 500,000 g/mol, from 400,000 g/mol to 480,000 g/mol, from 400,000 g/mol to 460,000 g/mol, from 400,000 g/mol to 440,000 g/mol, from 400,000 g/mol to 420,000 g/mol, from 420,000 g/mol to 500,000 g/mol, from 420,000 g/mol to 480,000 g/mol, from 420,000 g/mol to 460,000 g/mol, from 420,000 g/mol to 440,000 g/mol, from 440,000 g/mol to 500,000 g/mol, from 440,000 g/mol to 480,000 g/mol, from 440,000 g/mol to 460,000 g/mol, from 460,000 g/mol to 500,000 g/mol, from 460,000 g/mol to 480,000 g/mol, or from 480,000 g/mol to 500,000 g/mol as measured using gel permeation chromatography (GPC).

In embodiments, the ratio of the z-average molecular weight ($M_{z(GPC)}$) of the bimodal polyethylene composition to the weight average molecular weight ($M_{w(GPC)}$) of the bimodal polyethylene composition may be greater than 8.5. For example, the ratio of the z-average molecular weight ($M_{z(GPC)}$) of the bimodal polyethylene composition to the weight average molecular weight ($M_{w(GPC)}$) of the bimodal polyethylene composition may be greater than 9.0, greater than 9.5, or greater than 10.0. In embodiments, the ratio of the z-average molecular weight ($M_{z(GPC)}$) of the bimodal polyethylene composition to the weight average molecular weight ($M_{w(GPC)}$) of the bimodal polyethylene composition may be less than 10.5. For example, the ratio of the z-average molecular weight ($M_{z(GPC)}$) of the bimodal polyethylene composition to the weight average molecular weight ($M_{w(GPC)}$) of the bimodal polyethylene composition may be less than 10.0, less than 9.5, or less than 9.0. In some embodiments, the ratio of the z-average molecular weight ($M_{z(GPC)}$) of the bimodal polyethylene composition to the weight average molecular weight ($M_{w(GPC)}$) of the bimodal polyethylene composition may be from 8.5 to 10.5. For example, the ratio of the z-average molecular weight ($M_{z(GPC)}$) of the bimodal polyethylene composition to the weight average molecular weight ($M_{w(GPC)}$) of the bimodal polyethylene composition may be from 8.5 to 10.0, from 8.5 to 9.5, from 8.5 to 9.0, from 9.0 to 10.5, from 9.0 to 10.0, from 9.0 to 9.5, from 9.5 to 10.5, from 9.5 to 10.0, or from 10.0 to 10.5.

Embodiments of the bimodal polyethylene composition may have a peak molecular weight ($M_{p(GPC)}$) greater than 55,000 g/mol as measured using gel permeation chromatography (GPC). For example, embodiments of the bimodal polyethylene composition may have a peak molecular weight ($M_{p(GPC)}$) greater than 57,000 g/mol, greater than 59,000 g/mol, greater than 61,000 g/mol, or greater than 63,000 g/mol as measured using gel permeation chromatography (GPC). Embodiments of the bimodal polyethylene composition may also have peak molecular weight ($M_{p(GPC)}$) less than 65,000 g/mol as measured using gel permeation chromatography (GPC). For example, embodiments of the bimodal polyethylene composition may have a peak molecular weight ($M_{p(GPC)}$) less than 63,000 g/mol, less than 61,000 g/mol, less than 59,000 g/mol, or less than 57,000 g/mol as measured using gel permeation chromatography (GPC). In embodiments, the bimodal polyethylene composition may have a peak molecular weight ($M_{p(GPC)}$) of from 55,000 g/mol to 65,000 g/mol as measured using gel permeation chromatography (GPC). For example, embodiments of the bimodal polyethylene composition may have peak molecular weight ($M_{p(GPC)}$) of from 55,000 g/mol to 63,000 g/mol, from 55,000 g/mol to 61,000 g/mol, from 55,000 g/mol to 59,000 g/mol, from 55,000 g/mol to 57,000 g/mol, from 57,000 g/mol to 65,000 g/mol, from 57,000 g/mol to 63,000 g/mol, from 57,000 g/mol to 61,000 g/mol, from 57,000 g/mol to 59,000 g/mol, from 59,000 g/mol to 65,000 g/mol, from 59,000 g/mol to 63,000 g/mol, from 59,000 g/mol to 61,000 g/mol, from 61,000 g/mol to 65,000 g/mol, from 61,000 g/mol to 63,000 g/mol, or from 63,000 g/mol to 65,000 g/mol as measured using gel permeation chromatography (GPC).

Embodiments of the bimodal polyethylene composition may have a molecular weight distribution (MWD) greater than 12.5. The term "MWD" refers to the ratio of the weight average molecular weight ($M_{w(GPC)}$) of the bimodal polyethylene composition to the number average molecular weight ($M_{n(GPC)}$) of the bimodal polyethylene composition. For example, embodiments of the bimodal polyethylene composition may have an MWD greater than 13.5, greater than 14.5, or greater than 15.5. Embodiments of the bimodal polyethylene composition may also have an MWD less than 16.5. For example, embodiments of the bimodal polyethylene composition may also have an MWD less than 15.5, less than 14.5, or less than 13.5. In some embodiments, the bimodal polyethylene composition may have an MWD of from 12.5 to 16.5. For example, embodiments of the bimodal polyethylene composition may have an MWD of from 12.5 to 15.5, from 12.5 to 14.5, from 12.5 to 13.5, from 13.5 to 16.5, from 13.5 to 15.5, from 13.5 to 14.5, from 14.5 to 16.5, from 14.5 to 15.5, or from 15.5 to 16.5.

Embodiments of the bimodal polyethylene composition may have a secant modulus ($E_s$) greater than 965 Megapascals (MPa). For example, embodiments of the bimodal polyethylene composition may have an $E_s$ greater than 995 MPa, greater than 1,025 MPa, or greater than 1,055 MPa. Embodiments of the bimodal polyethylene composition may also have an $E_s$ less than 1,085 MPa. For example, embodiments of the bimodal polyethylene composition may have an $E_s$ less than 1,055 MPa, less than 1,025 MPa, or less than 995 MPa. In some embodiments, the bimodal polyethylene composition may have an $E_s$ of from 965 MPa to 1,085 MPa. For example, embodiments of the bimodal polyethylene composition may have an $E_s$ of from 965 MPa to 1,055 MPa, from 965 MPa to 1,025 MPa, from 965 MPa to 995 MPa, from 995 MPa to 1,085 MPa, from 995 MPa to 1,055 MPa, from 995 MPa to 1,025 MPa, from 1,025 MPa to 1,085 MPa, from 1,025 MPa to 1,055 MPa, or from 1,055 MPa to 1,085 MPa.

In embodiments, the bimodal polyethylene composition may be produced with a catalyst system in a single reactor. As used herein, a "catalyst system" may comprise a main catalyst, a trim catalyst, and, optionally, at least one activator. Catalyst systems may also include other components, such as supports, and are not limited to a main catalyst, a trim catalyst, and, optionally, at least one activator. Embodiments of the catalyst system may comprise a main catalyst and a metallocene trim catalyst. Embodiments of the catalyst system may also comprise one or more additives commonly used in the art of olefin polymerization. For example, embodiments of the catalyst system may comprise one or more continuity additives, flow aids, and anti-static aids. In some embodiments, the reactor may be a gas phase reactor, although slurry phase reactors may also be used.

Embodiments of the catalyst system may comprise at least one catalyst for producing a high molecular weight fraction of the bimodal polyethylene composition by polymerization (sometimes referred to herein as an "HMW catalyst"), and at least one catalyst compound for producing a low molecular weight fraction of the bimodal polyethylene composition by polymerization (sometimes referred to herein as an "LMW catalyst").

The HMW catalyst and the LMW catalyst may have different hydrogen responses. That is, the change in average molecular weight of a polyethylene made by each of the catalysts may be different when the molar ratio of hydrogen gas to ethylene ($H_2/C_2$ molar ratio) is changed. The term “high hydrogen response” refers to a catalyst that displays a relatively large change in the average molecular weight of a polyethylene when the $H_2/C_2$ molar ratio is changed by a set amount. The term “low hydrogen response” refers to a catalyst that displays a relatively low change in average molecular weight of polyethylene when the $H_2/C_2$ molar ratio is changed by the same set amount.

The HMW catalyst and the LMW catalyst may have different comonomer responses. That is, the comonomer content, such as weight percent, of a polyethylene made by each of the catalyst compounds may be different. The term “good incorporator” refers to a catalyst that displays a relatively high degree of comonomer incorporation, while a “poor incorporator” enchains relatively less comonomer. For catalyst systems employing a relatively good incorporator HMW catalyst and a relatively poor incorporator LMW catalyst, a “reverse comonomer distribution” is produced with higher comonomer content in the HMW component. Conversely, a good incorporator LMW catalyst used with a poor incorporator HMW catalyst produces a “normal comonomer distribution.”

Embodiments of the catalyst system may be referred to as a “bimodal catalyst system.” Such a catalyst system produces a bimodal polyethylene composition having separate, identifiable high molecular weight and low molecular weight distributions. The term “bimodal catalyst system” may comprise any formulation, mixture, or system that comprises at least two different catalyst compounds, each having the same or a different metal group, but generally different ligands or catalyst structure, including a “dual catalyst.” Alternatively, each different catalyst compound of the bimodal catalyst system resides on a single support particle, in which case a dual catalyst is considered to be a supported catalyst. However, the term “bimodal catalyst system” also broadly comprises a system or mixture in which one of the catalysts resides on one collection of support particles, and another catalyst resides on another collection of support particles. In such embodiments, the two supported catalysts are introduced to a single reactor, either simultaneously or sequentially, and polymerization is conducted in the presence of the two collections of supported catalysts. Alternatively, the bimodal catalyst system may comprise a mixture of unsupported catalysts in slurry form.

Embodiments of the catalyst system may comprise a main catalyst and a trim catalyst. In such embodiments, the main catalyst comprises at least one catalyst compound (the “main catalyst compound”) and a support, and may also comprise an activator, and/or any other additives such as previously described. The main catalyst may be delivered as a slurry in a hydrocarbon diluent, such as mineral oil. The trim catalyst comprises a trim catalyst compound. This trim catalyst compound may also be present in the main catalyst system. The trim catalyst may also comprise a solvent, such as a hydrocarbon, as well as other additives.

Embodiments of the trim catalyst compound may comprise a molecular catalyst compound, such as, for example, a metallocene catalyst compound. In some embodiments, the trim catalyst may be employed for producing a low molecular weight polymer fraction. In such embodiments, the main catalyst may be employed for producing a high molecular weight polymer fraction.

Embodiments of the main catalyst compound may comprise one or more Group 15 metal containing catalyst compounds. The Group 15 metal containing compound may generally comprise a Group 3 to 14 metal atom, or a Group 3 to 7, or a Group 4 to 6, or a Group 4 metal atom bound to at least one leaving group and at least two Group 15 atoms, at least one of which is also bound to a Group 15 or 16 atom through another group. At least one of the Group 15 atoms may be bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

The Group 15 metal containing compound may be represented by the formulae:

*Formula I*

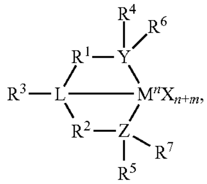

or

*Formula II*

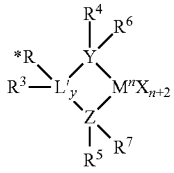

wherein M is a Group 3 to 12 transition metal or a Group 13 or 14 main group metal, or a Group 4, 5, or 6 metal, or a Group 4 metal, or zirconium, titanium or hafnium, and each X is independently a leaving group. X may be an anionic leaving group. X may be hydrogen, a hydrocarbyl group, a heteroatom or a halogen. X may be an alkyl, y may be 0 or 1 (when y is 0 group L' is absent), n is the oxidation state of M, which may be +3, +4, or +5, or may be +4, m is the formal charge of the YZL or the YZL' ligand, which may be 0, −1, −2 or −3, or may be −2, L is a Group 15 or 16 element, preferably nitrogen, L' is a Group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, halogen or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group. $R^1$ and $R^2$ may also be interconnected to each other, $R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen, $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom-containing group, for example $PR_3$ where R is an alkyl group, $R^1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and *R is absent, or is hydrogen, a Group 14 atom containing group, a halogen, or a heteroatom containing group.

By "formal charge of the YZL or YZL' ligand," it is meant the charge of the entire ligand absent the metal and the leaving groups X.

By "$R^1$ and $R^2$ may also be interconnected," it is meant that $R^1$ and $R^2$ may be directly bound to each other or may be bound to each other through other groups. By "$R^4$ and $R^5$ may also be interconnected," it is meant that $R^4$ and $R^5$ may be directly bound to each other or may be bound to each other through other groups.

Alkyl groups may be linear or branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

$R^4$ and $R^5$ may be independently a group represented by the following Formula III:

*Formula III*

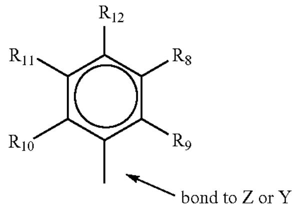

wherein $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. $R^9$, $R^{10}$, and $R^{12}$ may be independently a methyl, ethyl, propyl or butyl group (including all isomers). In a preferred embodiment any 3 of the R groups of formula III may be methyl groups, and any 2 of the other R groups of formula III may be hydrogen. In a preferred embodiment of the invention, $R^9$, $R^{10}$, and $R^{12}$ are methyl, and $R^8$ and $R^{11}$ are hydrogen.

$R^4$ and $R^5$ may be both a group represented by the following Formula IV:

*Formula IV*

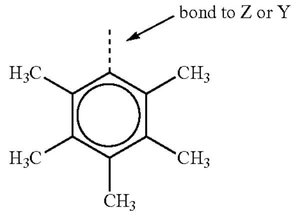

where M is a Group 4 metal, preferably zirconium, titanium or hafnium, and even more preferably zirconium; each of L, Y, and Z is nitrogen; each of $R^1$ and $R^2$ is $—CH_2—CH_2—$; $R^3$ is hydrogen; and $R^6$ and $R^7$ are absent.

The Group 15 and metal containing compound may be Compound I (also referred to as "bis(arylamido)Zr dibenzyl" represented below:

*Compound I*

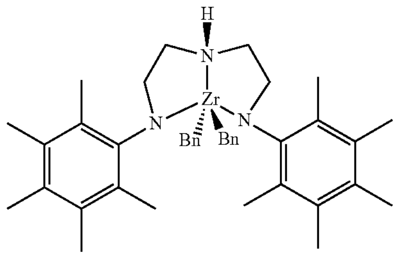

In the representation of Compound 1, "Bn" denotes a benzyl group.

Group 15 and metal containing catalyst compounds may be made by methods known in the art. In some cases, the methods disclosed in European Patent Application Publication No. EP 0 893 454 A1, U.S. Pat. No. 5,889,128 and the references cited in U.S. Pat. No. 5,889,128 are suitable.

In some embodiments, direct synthesis of these compounds includes reacting the neutral ligand, (for example YZL or YZL' of Formula I or II) with $M''X_n$ (M is a Group 3 to 14 metal, n is the oxidation state of M, each X is an anionic group, such as halide), in a non-coordinating or weakly coordinating solvent (such as ether, toluene, xylene, benzene, methylene chloride, and/or hexane or other solvent having a boiling point above 60° C.), at 20 to 150° C. (such as 20 to 100° C.), for 24 hours or more, then treating the mixture with an excess (such as four or more equivalents) of an alkylating agent, such as methyl magnesium bromide in ether. The magnesium salts are removed by filtration, and the metal complex isolated by standard techniques.

The Group 15 and metal containing compound may be made by a method comprising reacting a neutral ligand (for example YZL or YZL' of Formula I or II) with a compound represented by the formula $M''X_n$ (where M is a Group 3 to 14 metal, n is the oxidation state of M, and each X is an anionic leaving group) in a non-coordinating or weakly coordinating solvent, at 20° C. or above (preferably at 20 to 100° C.), then treating the mixture with an excess of an alkylating agent, then recovering the metal complex. The solvent may have a boiling point above 60° C., such as toluene, xylene, benzene, and/or hexane. The solvent may comprise ether and/or methylene chloride.

Generally, metallocene compounds may include half and full sandwich compounds having one or more ligands bonded to at least one metal atom. Typical metallocene compounds are generally described as containing one or more ligand(s) and one or more leaving group(s) bonded to at least one metal atom.

The ligands are generally represented by one or more open, acyclic, or fused ring(s) or ring system(s) or a combination thereof. These ligands, preferably the ring(s) or ring system(s) may be composed of atoms selected from Groups 13 to 16 atoms of the Periodic Table of Elements. The atoms may be selected from the group consisting of carbon, nitrogen, oxygen, silicon, sulfur, phosphorous, germanium, boron and aluminum or a combination thereof. The ring(s) or ring system(s) may be composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom may be selected from Groups 3 through 15 and the lanthanide or actinide series of the Periodic Table of Elements. The metal may be a transition metal from Groups 4 through 12, or Groups 4, 5 and 6, or the transition metal is from Group 4.

The catalyst composition may include one or more metallocene catalyst compounds represented by the Formula V:

$$L^AL^BMQ_n \qquad \text{Formula V}$$

where M is a metal atom from the Periodic Table of the Elements and may be a Group 3 to 12 metal or from the lanthanide or actinide series of the Periodic Table of Elements. M may be a Group 4, 5 or 6 transition metal, or M is a Group 4 transition metal, or M is zirconium, hafnium or titanium. The ligands, $L^A$ and $L^B$, may be open, acyclic or fused ring(s) or ring system(s) and may be any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. $L^A$ and $L^B$ may be any other ligand structure capable of $\pi$-bonding to M. The atomic molecular weight of $L^A$ and $L^B$ may exceed 60 a.m.u., or may exceed 65 a.m.u. $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ ligands include but are not limited to amides, phosphides, alkoxides, aryloxides, imides, carbolides, borollides, porphyrins, phthalocyanines, corrins and other polyazomacrocycles. Independently, each $L^A$ and $L^B$ may be the same or different type of ligand that is bonded to M. In one alternative of Formula V only one of either $L^A$ and $L^B$ may be present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl- carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that may also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R may form a carbon sigma bond to the metal M.

Other ligands may be bonded to the metal M, such as at least one leaving group Q. Q may be a monoanionic labile ligand having a sigma-bond to M. Depending on the oxidation state of the metal, the value for n may be 0, 1 or 2 such that Formula V above represents a neutral metallocene catalyst compound.

Non-limiting examples of Q ligands may include weak bases such as amines, phosphines, ethers, carboxylates, dienes, hydrocarbyl radicals having from 1 to 20 carbon atoms, hydrides or halogens and the like or a combination thereof. Two or more Q's may form a part of a fused ring or ring system. Other examples of Q ligands include those substituents for R as described above and including cyclobutyl, cyclohexyl, heptyl, tolyl, trifluoromethyl, tetramethylene, pentamethylene, methylidene, methoxy, ethoxy, propoxy, phenoxy, bis(N-methylanilide), dimethylamide, dimethylphosphide radicals and the like.

The catalyst composition may include one or more metallocene catalyst compounds where $L^A$ and $L^B$ of Formula V are bridged to each other by at least one bridging group, A, as represented by Formula VI:

$$L^AAL^BMQ_n \qquad \text{Formula VI}$$

The compounds of Formula VI are known as bridged, metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Bridging group A may contain a carbon, silicon or germanium atom, preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si$ $R'_2Si$, $R'_2Ge$, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. The bridged, metallocene catalyst compounds of Formula IV may have two or more bridging groups A (EP 0 664 301 B1).

The metallocene catalyst compounds may be those where the R substituents on the ligands $L^A$ and $L^B$ of Formulas V and VI are substituted with the same or different number of substituents on each of the ligands. The ligands $L^A$ and $L^B$ of Formulas V and VI may be different from each other.

The main catalyst system includes a main catalyst compound represented by Formula II above, such as a compound having the formula $[(2,3,4,5,6\text{-}Me_5C_6)NCH_2CH_2]_2NHZrBn_2$, where 2,3,4,5,6-$Me_5C_6$ represents a pentamethylphenyl group, and Bn is a benzyl group. Optionally, the main catalyst system may include a second main catalyst compound that may be represented by Formula V above, such as a zirconocene compound, such as (n-butylcyclopentadienyel)$_2$zirconium(IV) dichloride or (propylcyclopentadienyl)(1,3-dimethyl-4,5,6,7-tetrahydroindenyezirconium (IV) dimethyl.

The molar ratio of the HMW catalyst compound to the LMW catalyst compound in the catalyst formulation may be in the range from 1:20 to 20:1, or from 1:10 to 10:1, or from 1:5 to 5:1, or from 1:1 to 5:1, or from 1:1 to 3:1.

The trim catalyst may comprise a catalyst compound that may be represented by Formula VII below; specifically, Formula VII shows (cyclopentadienyl)(1,3-dimethyl-4,5,6,7-tetrahydroindenyl)zirconium dimethyl:

*Formula VII*

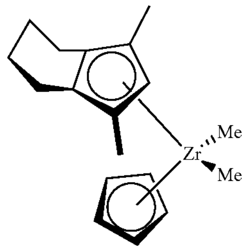

As used herein, the term "activator" may include any combination of reagents that increases the rate at which a transition metal compound oligomerizes or polymerizes unsaturated monomers, such as olefins. An activator may also affect the molecular weight, degree of branching, comonomer content, or other properties of the oligomer or polymer. The transition metal compounds may be activated for oligomerization and/or polymerization catalysis in any manner sufficient to allow coordination or cationic oligomerization and or polymerization.

Alumoxane activators may be utilized as an activator for one or more of the catalyst compositions. Alumoxane(s) or aluminoxane(s) are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208; 4,952,540; 5,041,584; 5,091,352; 5,206,199; 5,204,419; 4,874,734; 4,924,018; 4,908,463; 4,968,827; 5,329,032; 5,248,801; 5,235,081; 5,157,137; 5,103,031; and EP 0 561 476; EP 0 279 586; EP 0 516 476; EP 0 594 218; and WO 94/10180.

When the activator is an alumoxane (modified or unmodified), the maximum amount of activator may be selected to be a 5000-fold molar excess Al/M over the catalyst precursor (per metal catalytic site). Alternatively or additionally the minimum amount of activator-to-catalyst-precursor may be set at a 1:1 molar ratio.

Aluminum alkyl or organoaluminum compounds that may be utilized as activators (or scavengers) include trimethylaluminum, triethylaluminum, triisobutylaluminum, tri-n-hexylaluminum, tri-n-octylaluminum and the like.

The catalyst systems may include a support material or carrier. For example, the at least one or more catalyst compounds and/or one or more activators may be deposited on, contacted with, vaporized with, bonded to, or incorporated within, adsorbed or absorbed in, or on, one or more supports or carriers. Thus, the above described catalyst compounds as well as other transition metal catalyst compounds and/or catalyst systems may be combined with one or more support materials or carriers using one of the support methods well known in the art or as described below. For example, a metallocene catalyst compound or catalyst system is in a supported form, for example, when deposited on, contacted with, or incorporated within, adsorbed or absorbed in, or on, a support or carrier.

As used herein, the terms "support" and "carrier" are used interchangeably and are any support material, including a porous support material, for example, talc, inorganic oxides, and inorganic chlorides. Other carriers include resinous support materials such as polystyrene, functionalized or crosslinked organic supports, such as polystyrene divinyl benzene polyolefins or other polymeric compounds, zeolites, clays or any other organic or inorganic support material and the like, or mixtures thereof.

Illustrative support materials such as inorganic oxides include Group 2, 3, 4, 5, 13 or 14 metal oxides. The preferred supports include silica, which may or may not be dehydrated, fumed silica, alumina (see, for example, WO 99/60033), silica-alumina and mixtures thereof. Other useful supports include magnesia, titania, zirconia, magnesium chloride (U.S. Pat. No. 5,965,477), montmorillonite (EP 0 511 665), phyllosilicate, zeolites, talc, clays (U.S. Pat. No. 6,034,187), and the like. Also, combinations of these support materials may be used, for example, silica-chromium, silica-alumina, silica-titania and the like. Additional support materials may include those porous acrylic polymers described in EP 0 767 184, which is incorporated herein by reference. Other support materials include nanocomposites as disclosed in WO 99/47598; aerogels as disclosed in WO 99/48605; spherulites as disclosed in U.S. Pat. No. 5,972,510; and polymeric beads as disclosed in WO 99/50311.

In some embodiments, all catalyst compounds of the catalyst system independently may be unsupported, alternatively supported on a support material, in which latter case the catalyst system is a supported catalyst system. When each catalyst compound is supported, the catalyst compounds may reside on the same support material (e.g., same particles), or on different support materials (e.g., different particles). The bimodal catalyst system includes mixtures of unsupported catalyst compounds in slurry form and/or solution form. The support material may be a silica (e.g., fumed silica), alumina, a clay, or talc. The fumed silica may be hydrophilic (untreated), alternatively hydrophobic (treated). In some aspects the support is the hydrophobic fumed silica, which may be prepared by treating an untreated fumed silica with a treating agent such as dimethyldichlorosilane, a polydimethylsiloxane fluid, or hexamethyldisilazane. In some aspects the treating agent is dimethyldichlorosilane.

In some embodiments, the support material, such as an inorganic oxide, may have a surface area in the range of from 10 $m^2/g$ to 700 $m^2/g$, pore volume in the range of from 0.1 $cm^3/g$ to 4.0 $cm^3/g$ and average particle size in the range of from 5 microns to 500 microns. More preferably, the surface area of the support material may be in the range from 50 $m^2/g$ to 500 $m^2/g$, pore volume from 0.5 $cm^3/g$ to 3.5 $cm^3/g$ and average particle size of from 10 microns to 200 microns. Most preferably the surface area of the support material may be in the range is from 100 $m^2/g$ to 400 $m^2/g$, pore volume from 0.8 $cm^3/g$ to 3.0 $cm^3/g$ and average particle size is from 5 microns to 100 microns. The average pore size of the carrier typically has pore size in the range of from 10 Angstroms to 1,000 Angstroms, alternatively from 50 Angstroms to 500 Angstroms, and in some embodiments from 75 Angstroms to 350 Angstroms. There are various other methods in the art for supporting a polymerization catalyst compound or catalyst system. For example, the metallocene catalyst compounds may contain a polymer bound ligand as described in, for example, U.S. Pat. Nos. 5,473,202 and 5,770,755. The metallocene catalyst compounds may be spray dried as described in, for example, U.S. Pat. No. 5,648,310. The support used with the metallocene catalyst compounds may be functionalized, as described in EP 0 802 203, or at least one substituent or leaving group is selected as described in U.S. Pat. No. 5,688,880.

The polyethylene formulations disclosed herein may be made by gas phase processes. The formulations may be made in a single reactor. The polyethylene formulations disclosed herein may also be made in a single gas phase reactor. In one embodiment of the invention, the reactor is a gas phase fluidized bed polymerization reactor.

The polyethylene may be produced using a staged gas phase reactor. Commercial polymerization systems are described in, for example, "Volume 2, Metallocene-Based Polyolefins," at pages 366-378 (John Scheirs & W. Kaminsky, eds. John Wiley & Sons, Ltd. 2000); U.S. Pat. Nos. 5,665,818; 5,677,375; and 6,472,484; and EP 0 517 868 and EP 0 794 200.

Gas phase processes may utilize a fluidized bed reactor. A fluidized bed reactor may include a reaction zone and a so-called velocity reduction zone. The reaction zone may include a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream may be at a rate equal to the rate at which particulate polymer product and monomer associated therewith may be withdrawn from the reactor and the composition of the gas passing through the reactor may be adjusted to maintain an essentially steady state gaseous composition within the reaction zone. The gas leaving the reaction zone may be passed to the velocity reduction zone where entrained particles are removed. Finer entrained particles and dust may be removed in a cyclone and/or fine filter. The gas may be passed through a heat exchanger where the heat of polymerization may be removed, compressed in a compressor, and then returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; EP 0802202; and Belgian Patent No. 839,380.

The reactor temperature of the fluidized bed process may range from 30° C. or 40° C. or 50° C. to 90° C. or 100° C. or 110° C. or 120° C. or 150° C. In general, the reactor temperature may be operated at the highest temperature feasible taking into account the sintering temperature of the ethylene-based polymer product within the reactor. Regardless of the process used to make the polyolefins, e.g., bimodal polyethylene, the polymerization temperature or reaction temperature should be below the melting or "sintering" temperature of the ethylene-based polymer to be formed. Thus, the upper temperature limit may be the melting temperature of the polyolefin produced in the reactor.

Hydrogen gas may be used in olefin polymerization to control the final properties of the polyolefin, such as described in "Polypropylene Handbook," at pages 76-78 (Hanser Publishers, 1996). The amount of hydrogen in the polymerization may be expressed as a mole ratio relative to the total polymerizable monomer, for example, ethylene, or a blend of ethylene and 1-hexene or propylene. The amount of hydrogen used in the polymerization process may be an amount necessary to achieve the desired MFR or FI of the final polyolefin resin. The amount of hydrogen used in the polymerization process may also be an amount necessary to achieve a desired bimodal molecular weight distribution between the high molecular weight component and the low molecular weight component of a bimodal polyolefin.

The catalyst system may also be used to further control the properties of the polyethylene formulation. For example, the amount of trim catalyst may be adjusted to modify the in-reactor ratio of the catalyst compounds of the catalyst system so as to achieve a desired flow index or flow index split. The trim catalyst may be fed directly to the reactor separately from the main catalyst compound of the catalyst system. The trim catalyst may also be mixed with the main catalyst compound of the catalyst system prior to feeding to the reactor. The trim catalyst may also be continuously mixed with the other compounds of the catalyst system and the resulting mixture continuously fed to the reactor. The trim catalyst may be continuously mixed with a supported catalyst and the resulting mixture continuously fed to the reactor. The trim catalyst may be a supported catalyst or an unsupported catalyst. Where the trim catalyst is an unsupported catalyst it may be supported 'in-line' for example by contacting with a supported catalyst prior to feeding to the reactor. The supported trim catalyst may comprise an activator that may activate the trim catalyst 'in-line' prior to feeding to the reactor.

The trim catalyst may be provided in a form that is the same or different to that of the main catalyst compound (or one of the main catalyst compounds) of the catalyst system. However, upon activation by a suitable activator the active catalyst species resulting from the trim catalyst may be the same as the active catalyst species resulting from one of the at least two different catalyst compounds of the catalyst. The skilled person would appreciate that, for example, a metallocene dihalide and a metallocene dialkyl may yield the same active catalyst species upon treatment with a suitable activator. For example, a metallocene such as (cyclopentadienyl)(1,3-dimethyl-4,5,6,7-tetrahydroindenyl)zirconium $(X)_2$ (where X can be a halide, alkyl, or any other leaving group as previously described) may be used in the dichloride form to make a supported catalyst. When used as a trim catalyst it may be provided in the dialkyl form such as the dimethyl form. This may be advantageous in regard to solubility where dialkyl forms may have enhanced solubility in, for example, aliphatic hydrocarbons.

The catalyst system may comprise at least one, or two or more, catalyst compound(s) comprising a titanium, a zirconium, or a hafnium atom. The catalyst system may comprise at least one, or two or more, of the following:

(pentamethylcyclopentadienyl)(n-propylcyclopentadienyl)$MX_2$;
(tetramethylcyclopentadienyl)(n-propylcyclopentadienyl)$MX_2$;
(tetramethylcyclopentadienyl)(n-butylcyclopentadienyl)$MX_2$;
(n-propylcyclopentadienyl)(1,3-dimethyl-4,5,6,7-tetrahydroindenyl)$MX_2$;
(methylcyclopentadienyl)(1,3-dimethyl-4,5,6,7-tetrahydroindenyl)$MX_2$;
(cyclopentadienyl)(1,3-dimethyl-4,5,6,7-tetrahydroindenyl)$MX_2$;
(methylcyclopentadienyl)(1-methyl-4,5,6,7-tetrahydroindenyl)$MX_2$;
$Me_2Si(indenyl)_2MX_2$;
$Me_2Si(4,5,6,7\text{-tetrahydroindenyl})_2MX_2$;
(n-propyl cyclopentadienyl)$_2MX_2$;
(n-butyl cyclopentadienyl)$_2MX_2$;
(1-methyl, 3-butyl cyclopentadienyl)$_2MX_2$;
$[HN(CH_2CH_2N(2,4,6\text{-}Me_3C_6H_2))_2]MX_2$;
$[HN(CH_2CH_2N(2,3,4,5,6\text{-}Me_5C_6))_2]MX_2$;

and mixtures thereof, wherein M is Zr or Hf, and X is selected from F, Cl, Br, I, Me, benzyl, $CH_2SiMe_3$, and $C_1$ to $C_5$ alkyls or alkenyls.

The mole ratio of hydrogen to total monomer ($H_2$:monomer) may be in a range from greater than 0.0001, greater than 0.0005, or greater than 0.001, and less than 10, less than 5, less than 3, or less than 0.10, wherein a desirable range may include any combination of any upper mole ratio limit with any lower mole ratio limit described herein. Expressed another way, the amount of hydrogen in the reactor at any time may range up to 5,000 ppm, up to 4,000 ppm, or up to 3,000 ppm, or between 50 ppm and 5,000 ppm, or between 500 ppm and 2,000 ppm.

The one or more reactor pressures in a gas phase process (either single stage or two or more stages) may vary from 690 kPa (100 psig) to 3,448 kPa (500 psig). For example, they may range from 1,379 kPa (200 psig) to 2,759 kPa (400 psig) or from 1,724 kPa (250 psig) to 2,414 kPa (350 psig).

The bimodal polyethylene compositions may be used in a wide variety of products and end-use applications. The bimodal polyethylene compositions may also be blended and/or coextruded with any other polymer. Non-limiting examples of other polymers include linear low density polyethylenes, elastomers, plastomers, high pressure low density polyethylene, high density polyethylenes, polypropylenes and the like. The bimodal polyethylene compositions and blends thereof may be used to produce blow molded components or products, among other various end uses. The bimodal polyethylene compositions and blends thereof may be useful in forming operations such as film, sheet, and fiber extrusion and co-extrusion as well as blow molding, injection molding and rotary molding. Films may include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, and membranes in food-contact and non-food contact applications. Fibers may include melt spinning, solution spinning and melt blown fiber operations for use in woven or non-woven form to make filters, diaper fabrics, medical garments, and geotextiles. Extruded articles may include medical tubing, wire and cable coatings, pipe, geomembranes, and pond liners. Molded articles may include single and multi-layered constructions in the form of bottles, tanks, large hollow articles, rigid food containers and toys.

Embodiments of the article made from the bimodal polyethylene composition may have an environmental stress-cracking resistance (ESCR) greater than 150 hours. ESCR is a measure of the strength of the article in terms of its ability to resist failure by stress crack growth. A high ESCR value is important because the article should last through the designed application lifetime. The ESCR testing is performed in accordance with ASTM D1693, Procedure B. This is an accelerated test to determine the time to failure using 10% Igepal CO-630 nonionic surfactant solution at 50° C. The time to failure of 50% of the tested samples ($F_{50}$ hours) is estimated from the measured values. For example, embodiments of the article made from the bimodal polyethylene composition may have an ESCR greater than 160 hours, greater than 170 hours, greater than 180 hours, or greater than 190 hours. Embodiments of the article made from the bimodal polyethylene composition may also have an ESCR less than 200 hours. For example, embodiments of the article made from the bimodal polyethylene composition may also have an ESCR less than 190 hours, less than 180 hours, less than 170 hours, or less than 150 hours. In some embodiments, the article made from the bimodal polyethylene composition may also have an ESCR of from 150 hours to 200 hours. For example, embodiments of the article made from the bimodal polyethylene composition may also have an ESCR of from 150 hours to 190 hours, from 150 hours to 180 hours, from 150 hours to 170 hours, from 150 hours to 160 hours, from 160 hours to 200 hours, from 160 hours to 190 hours, from 160 hours to 180 hours, from 160 hours to 170 hours, from 170 hours to 200 hours, from 170 hours to 190 hours, from 170 hours to 180 hours, from 180 hours to 200 hours, from 180 hours to 190 hours, or from 190 hours to 200 hours.

Test Methods

Density

The density of the samples were measured according to ASTM D792-13, Method B, after conditioning at 23±2° C. and 50±10% relative humidity for no less than 40 hours, and are reported in grams per cubic centimeter (g/cm$^3$).

High Load Melt Index

High load melt indices ($I_{21}$) were measured according to ASTM D1238 at 190° C. and a 21.6 kg load, and are reported in decigrams per minute (dg/min).

Melt Index ($I_5$)

The melt index ($I_5$) was measured according to ASTM D1238 at 190° C. and a 5.0 kg load and are reported in decigrams per minute (dg/min).

Molecular Weight

Molecular weights, including peak molecular weight ($M_{p(GPC)}$), weight average molecular weight ($M_{w(GPC)}$), number average molecular weight ($M_{n(GPC)}$), and z-average molecular weight ($M_{z(GPC)}$), were measured using conventional Gel Permeation Chromatography (GPC) and are reported in grams per mole (g/mol).

The chromatographic system consisted of a PolymerChar GPC-IR (Valencia, Spain) high temperature GPC chromatograph equipped with an internal IR5 infra-red detector (IR5). The autosampler oven compartment was set at 160° C. and the column compartment was set at 150° C. The columns used were four Agilent "Mixed A" 30 centimeter (cm) 20-micron linear mixed-bed columns. The chromatographic solvent used was 1,2,4 trichlorobenzene and contained 200 parts per million (ppm) of butylated hydroxytoluene (BHT). The solvent source was nitrogen sparged. The injection volume used was 200 microliters (μl) and the flow rate was 1.0 milliliters/minute (ml/min).

Calibration of the columns was performed with at least 20 narrow molecular weight distribution polystyrene standards with molecular weights ranging from 580 to 8,400,000 g/mol and were arranged in 6 "cocktail" mixtures with at least a decade of separation between individual molecular weights. The standards were purchased from Agilent Technologies. The standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The standards were dissolved at 80° C. with gentle agitation for 30 minutes. The standard peak molecular weights were converted to ethylene-based polymer molecular weights using Equation 1 (as described in Williams and Ward, J. Polym. Sci., Polym. Let., 6, 621 (1968)):

$$M_{polethylene}=A\times(M_{polystyrene})^{B} \quad \text{Equation 1}$$

where M is the molecular weight, A has a value of 0.4315, and B is equal to 1.0.

A fifth order polynomial was used to fit the respective ethylene-based polymer-equivalent calibration points. A minor adjustment to A (from approximately 0.39 to 0.44) was made to correct for column resolution and band-broadening effects such that NIST standard NBS 1475 is obtained at a molecular weight of 52,000 g/mol.

The total plate count of the columns was performed with Eicosane (prepared at 0.04 grams in 50 milliliters of TCB and dissolved with gentle agitation for 20 minutes). The plate count (Equation 2) and symmetry (Equation 3) were measured on a 200 microliter injection according to the following equations:

$$\text{Plate Count} = 5.54\times\left(\frac{RV_{Peak\ Max}}{\text{Peak Width at half height}}\right)^{2} \quad \text{Equation 2}$$

where RV is the retention volume in milliliters, peak width is in milliliters, peak max is the maximum height of the peak, and half height is one half of the height of peak max, and $$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad \text{Equation 3}$$

where RV is the retention volume in milliliters, peak width is in milliliters, peak max is the maximum height of the peak, one tenth height is one tenth of the height of peak max, rear peak refers to the peak tail at retention volumes later than peak max, and front peak refers to the peak front at retention volumes earlier than peak max. The plate count for the chromatographic system should be greater than 22,000 and symmetry should be between 0.98 and 1.22.

Samples were prepared in a semi-automatic manner with the PolymerChar "Instrument Control" Software, wherein the samples were weight-targeted at 2 milligrams per milliliter (mg/ml), and the solvent, which contained 200 ppm BHT, was added to a pre nitrogen-sparged septa-capped vial, via the PolymerChar high-temperature autosampler. The samples were dissolved under "low speed" shaking for 3 hours at 160° C.

The calculations of $M_{n(GPC)}$, $M_{w(GPC)}$, and $M_{z(GPC)}$ were based on GPC results using the internal IR5 detector (measurement channel) of the PolymerChar GPC-IR chromatograph according to Equations 4-7, using PolymerChar GPCOne™ software, the baseline-subtracted IR chromatogram at each equally-spaced data collection point i ($IR_i$) and the ethylene-based polymer equivalent molecular weight obtained from the narrow standard calibration curve for the point i ($M_{polyethylene,i}$ in g/mol) from Equation 1. Subsequently, a GPC molecular weight distribution (GPC-MWD) plot ($wt_{GPC}$(lgMW)) vs. lgMW plot, where $wt_{GPC}$(lgMW) is the weight fraction of ethylene-based polymer molecules with a molecular weight of lgMW for the ethylene-based polymer sample can be obtained. Molecular weight (MW) is in g/mol and wtGpc(lgMW) follows the Equation 4.

$$\int wt_{GPC}(\lg MW)d \lg MW=1.00 \quad \text{Equation 4}$$

$M_{n(GPC)}$, $M_{w(GPC)}$ and $M_{z(GPC)}$ were calculated by the following equations:

$$Mn_{(GPC)} = \frac{\sum^{i} IR_i}{\sum^{i}\left(IR_i/M_{polyethylene,i}\right)} \quad \text{Equation 5}$$

$$Mw_{(GPC)} = \frac{\sum^{i}\left(IR_i * M_{polyethylene,i}\right)}{\sum^{i} IR_i} \quad \text{Equation 6}$$

$$Mz_{(GPC)} = \frac{\sum^{i}\left(IR_i * M^{2}_{polyethylene,i}\right)}{\sum^{i}\left(IR_i * M_{polyethylene,i}\right)} \quad \text{Equation 7}$$

$M_{p(GPC)}$ was the molecular weight at which the $wt_{GPC}$ (lgMW) had the highest value on the GPC-MWD plot.

In order to monitor the deviations over time, a flow rate marker (decane) was introduced into each sample via a micropump controlled with the PolymerChar GPC-IR system. This flow rate marker (FM) was used to linearly correct the pump flow rate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flow rate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (with respect to the narrow standards calibration) is calculated as Equation 11. Processing of the flow marker peak was done via the PolymerChar GPCOne™ Software. Acceptable flow rate correction is such that the effective flowrate should be within 0.5% of the nominal flowrate.

$$\text{Flow rate}_{effective}=\text{Flow rate}_{nominal}\times(RV(FM_{calibrated})/RV(FM_{Sample})) \quad \text{Equation 11}$$

Environmental Stress-Cracking Resistance (ESCR)

Samples for ESCR measurements were prepared according to ASTM D4703 per Annex A.1 Procedure C. Samples were compression molded at 190° C. into a 0.075 inch sheet, which was conditioned at 23±2° C. and 50±5% relative humidity for at least 24 hours before the individual coupons were stamped out using an appropriate die. The coupon dimensions were 38 millimeters (mm) by 13 mm with a thickness of 1.90 mm. The coupons were further conditioned at 23±2° C. and 50±5% relative humidity and tested at least 40 hours after compression molding, but within 96 hours of compression molding. The ESCR was measured according to ASTM-D 1693-01, Condition B. The sample thickness was measured to ensure they were within the ASTM 1693-01 specifications. Immediately prior to testing, the samples were notched to the required depth and then bent and loaded into the specimen holder. The holder was then placed in a test tube filled with a 10 percent, by volume, Igepal CO-630 (vendor Rhone-Poulec, NJ) aqueous solution, maintained at 50° C. The $F_{50}$ failure time is reported.

Modulus

The 2% Secant flexural modulus is measured according to ASTM D790. The specimen is prepared via compression molding according to ASTM D4703 and is tested by 3-point deflection with a standard span of 2 inches with a specimen thickness of 0.12 inches to 0.13 inches. Test speed is 0.5 inch per minute. The standard specimen is ½ inch wide by 5 inches long. The specimen is tested to 5% strain with modulus. The 2% secant modulus is reported in Megapascals (MPa) and/or kilopound per square inch (ksi).

EXAMPLES

Example 1

To produce Example 1, a bimodal polyethylene was produced via gas phase polymerization in a single-reactor. A main catalyst, commercially available as PRODIGY™ BMC-300 from Univation Technologies, was fed to a polyethylene reactor, commercially available as UNIPOL™ from Univation Technologies, via a 0.25 inch (") injection tube. A trim catalyst that was a mixture of 0.04 weight percent (wt. %) bis(n-butylcyclopentadienyl)zirconium dimethyl in isopentane was also fed to the polyethylene reactor via the same 0.25" injection tube at a rate sufficient to provide the desired resin flow index. The reactor gas composition was controlled by metering the feeds to the polyethylene reactor at a rate sufficient to maintain an ethylene partial pressure of 220 pounds per square inch (psi), a molar ratio of n-hexene ($C_6$) to ethylene ($C_2$) of 0.0004, a molar ratio of hydrogen gas ($H_2$) to ethylene ($C_2$) of 0.0007, and isopentane in an amount of 13.9 mole percent (mol. %). An additive, commercially available as CA-300 from Univation Technologies, was fed separately to the polyethylene reactor at a rate sufficient to maintain an additive concentration of about 45 parts per million by weight (ppmw) based on ethylene feed rate to the reactor. The polyethylene reactor temperature was maintained at 105 degrees Celsius (° C.) and the reactor residence time was about 2.8 hours. The reactor bed weight was maintained by discharging granular resin into a discharge tank, which was purged with nitrogen before being dumped into a fiberpack and purged again with a mixture of nitrogen and steam.

Example 2

To produce Example 2, a bimodal polyethylene was produced via gas phase polymerization in a single-reactor. A main catalyst, commercially available as PRODIGY™ BMC-300 from Univation Technologies, was fed to a polyethylene reactor, commercially available as UNIPOL™ from Univation Technologies, via a 0.25" injection tube. A trim catalyst that was a mixture of 0.04 wt. % bis(n-butylcyclopentadienyl)zirconium dimethyl in isopentane was also fed to the polyethylene reactor via the same 0.25" injection tube at a rate sufficient to provide the desired resin flow index. The reactor gas composition was controlled by metering the feeds to the polyethylene reactor at a rate sufficient to maintain an ethylene partial pressure of 220 psi, a molar ratio of n-hexene ($C_6$) to ethylene ($C_2$) of 0.0002, a molar ratio of hydrogen gas ($H_2$) to ethylene ($C_2$) of 0.0004, and isopentane in an amount of 7 mol. %. An additive, commercially available as CA-300 from Univation Technologies, was fed separately to the polyethylene reactor at a rate sufficient to maintain an additive concentration of about 45 ppmw based on ethylene feed rate to the reactor. The polyethylene reactor temperature was maintained at 105° C. and the reactor residence time was about 2.8 hours. The reactor bed weight was maintained by discharging granular resin into a discharge tank, which was purged with nitrogen before being dumped into a fiberpack and purged again with a mixture of nitrogen and steam.

Comparative Example 1

To produce Comparative Example 1, a bimodal polyethylene was produced via gas phase polymerization in a single-reactor. A main catalyst, commercially available as PRODIGY™ BMC-300 from Univation Technologies, was fed to a polyethylene reactor, commercially available as UNIPOL™ from Univation Technologies, via a 0.25" injection tube. A trim catalyst that was a mixture of 0.04 wt. % bis(n-butylcyclopentadienyl)zirconium dimethyl in isopentane was also fed to the polyethylene reactor via the same 0.25" injection tube at a rate sufficient to provide the desired resin flow index. The reactor gas composition was controlled by metering the feeds to the polyethylene reactor at a rate sufficient to maintain an ethylene partial pressure of 220 psi, a molar ratio of n-hexene ($C_6$) to ethylene ($C_2$) of 0.0009, a molar ratio of hydrogen gas ($H_2$) to ethylene ($C_2$) of 0.0007, and isopentane in an amount of 15.2 mol. %. An additive, commercially available as CA-300 from Univation Technologies, was fed separately to the polyethylene reactor at a rate sufficient to maintain an additive concentration of about 45 ppmw based on ethylene feed rate to the reactor. The polyethylene reactor temperature was maintained at 105° C. and the reactor residence time was about 2.8 hours. The reactor bed weight was maintained by discharging granular resin into a discharge tank, which was purged with nitrogen before being dumped into a fiberpack and purged again with a mixture of nitrogen and steam.

Comparative Example 2

To produce Comparative Example 6, a bimodal polyethylene was produced via gas phase polymerization in a single-reactor. A main catalyst, commercially available as PRODIGY™ BMC-300 from Univation Technologies, was fed to a polyethylene reactor, commercially available as UNIPOL™ from Univation Technologies, via a 0.25" injection tube. A trim catalyst that was a mixture of 0.04 wt. % bis(n-butylcyclopentadienyl)zirconium dimethyl in isopentane was also fed to the polyethylene reactor via the same 0.25" injection tube at a rate sufficient to provide the desired resin flow index. The reactor gas composition was controlled by metering the feeds to the polyethylene reactor at a rate sufficient to maintain an ethylene partial pressure of 220 psi, a molar ratio of n-hexene ($C_6$) to ethylene ($C_2$) of 0.0005, a molar ratio of hydrogen gas ($H_2$) to ethylene ($C_2$) of 0.0004, and isopentane in an amount of 6 mol. %. An additive, commercially available as CA-300 from Univation Technologies, was fed separately to the polyethylene reactor at a rate sufficient to maintain an additive concentration of about 45 ppmw based on ethylene feed rate to the reactor. The polyethylene reactor temperature was maintained at 105° C. and the reactor residence time was about 2.8 hours. The reactor bed weight was maintained by discharging granular resin into a discharge tank, which was purged with nitrogen before being dumped into a fiberpack and purged again with a mixture of nitrogen and steam.

Reactor Conditions for Examples 1 & 2 and Comparative Examples 1 & 2

The reactor conditions for Examples 1 and 2, and Comparative Examples 1 and 2 are summarized and reported in Table 1. Examples 1 and 2 include lower $C_6/C_2$ Molar Ratios than the Comparative Examples 1 and 2.

TABLE 1

| Example # | Example 1 | Example 2 | Comparative Example 1 | Comparative Example 2 |
|---|---|---|---|---|
| Reactor Bed Temperature (° C.) | 105 | 86 | 105 | 86 |
| Reactor Total Pressure (psig) | 348 | 351 | 350 | 300 |
| Bed Weight (lbs) | 99 | 112 | 104 | 473 |
| Bed Height (ft) | 6.2 | 7.0 | 6.2 | 22.2 |
| Reactor Gas Velocity (ft/s) | 2.06 | 2.05 | 1.76 | 1.94 |
| Ethylene Partial Pressure (psi) | 220 | 220 | 220 | 220 |
| $C_6/C_2$ Molar Ratio | 0.0004 | 0.0002 | 0.0009 | 0.0005 |
| $H_2/C_2$ Molar Ratio | 0.0007 | 0.0004 | 0.0007 | 0.0004 |
| Isopentane (mol. %) | 13.9 | 7 | 15.2 | 6 |

Molecular Weight Values of Examples 1 & 2 and Comparative Examples 1 & 2

Various molecular weight values, such as $M_{n(GPC)}$, $M_{w(GPC)}$, $M_{z(GPC)}$, and $M_{p(GPC)}$, for Examples 1 and 2, and Comparative Examples 1 and 2 are summarized and reported in Table 2.

TABLE 2

| Example # | Example 1 | Example 2 | Comparative Example 1 | Comparative Example 2 |
|---|---|---|---|---|
| $M_{n(GPC)}$ (g/mol) | 30,080 | 37,202 | 23,543 | 30,346 |
| $M_{w(GPC)}$ (g/mol) | 486,170 | 480,897 | 468,636 | 373,382 |
| $M_{z(GPC)}$ (g/mol) | 4,883,780 | 4,426,289 | 3,861,814 | 3,007,670 |
| MWD | 16.2 | 12.9 | 19.9 | 12.3 |
| $M_{z(GPC)}/M_{w(GPC)}$ | 10.0 | 9.2 | 8.2 | 8.1 |
| $M_{p(GPC)}$ (g/mol) | 53,630 | 60,256 | 47,863 | 69,183 |
| 2,805.3 × MWD + 102,688 | 57,242 | 66,500 | 46,863 | 68,183 |

Properties of Examples 1 & 2 and Comparative Examples 1 & 2

Various properties, such as density, high load melt index, secant modulus, and ESCR, for Examples 1 and 2, and Comparative Examples 1 and 2 are summarized and reported in Table 3.

TABLE 3

| Example # | Example 1 | Example 2 | Comparative Example 1 | Comparative Example 2 |
|---|---|---|---|---|
| Density (g/cm$^3$) | 0.955 | 0.954 | 0.952 | 0.955 |
| $I_{21}$ (dg/min) | 6.0 | 5.3 | 5.3 | 6.7 |
| MFR5 ($I_{21}/I_5$) | 29 | 23 | 30 | 23 |
| Secant Modulus ($E_s$) (ksi) | 152 | 143 | 140 | 131 |
| −2,622 + 2,822 × Density + 2.5 × MFR5 | 146 | 128 | 140 | 131 |
| MWD | 16.2 | 12.9 | 19.9 | 12.3 |
| −4,570.6 + 4,883 × Density + 31 × MWD | 143 | 128 | 140 | 131 |
| ESCR (10%, F50) (Hr) | 180 | 164 | 557 | 102 |

As shown in Tables 2 and 3, Examples 1 and 2 have a density from 0.952 g/cm$^3$ to 0.957 g/cm$^3$, a high load melt index ($I_{21}$) from 1.0 to 10 dg/min, an $M_{z(GPC)}$ greater than 3,200,000 g/mol, and an $M_{p(GPC)}$ that is less than 2,805.3 times the MWD plus 102,688. Examples 1 and 2 also have an $E_s$ greater than 965 MPa (approximately 140 ksi) and an ESCR greater than 150 hours. Conversely, neither Comparative Example 1 nor Comparative Example 2 have an $M_{z(GPC)}$ greater than 3,200,000 g/mol or an $M_{p(GPC)}$ that is less than 2,805.3 times the MWD plus 102,688.

Moreover, Example 2 and Comparative Example 2 have similar MFR5 values, which correlates to the processability of the samples; however, Example 2 has a higher secant modulus and ESCR than Comparative Example 2. That is, Comparative Example 2 may have similar processability to Example 2, but sacrificed secant modulus and ESCR. Similarly, Example 1 exhibits a greater $E_s$, which correlates to the stiffness of the samples compared to Comparative Example 1 while maintaining a similar MFR5 value and a suitable ESCR. That is, Examples 1 and 2 have improved balances of stiffness, ESCR and processability compared to Comparative Examples 1 and 2.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 g/cm$^3$" is intended to mean "about 40 g/cm$^3$."

Every document cited herein, if any, including any cross-referenced or related patent or patent application and any patent or patent application to which this application claims priority or benefit thereof, is hereby incorporated herein by reference in its entirety unless expressly excluded or otherwise limited. The citation of any document is not an admission that it is prior art with respect to any embodiment disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

The invention claimed is:

1. A bimodal polyethylene composition having:

a density ($\rho$) from 0.952 g/cm$^3$ to 0.957 g/cm$^3$ when measured according to ASTM D792-08, Method B;

a high load melt index ($I_{21}$) from 1.0 to 10 dg/min when measured according to ASTM D1238 at 190° C. and a 21.6 kg load;

a peak molecular weight ($M_{p(GPC)}$) defined by the equation: $M_{p(GPC)}$<−2,805.3×MWD+102,688, wherein MWD is a molecular weight distribution defined by the equation: MWD=$M_{w(GPC)}/M_{n(GPC)}$, $M_{w(GPC)}$ is a weight average molecular weight of the bimodal polymer composition, and $M_{n(GPC)}$ is a number average molecular weight of the bimodal polymer composition, and wherein $M_{p(GPC)}$, $M_{w(GPC)}$, and $M_{n(GPC)}$ are measured using gel permeation chromatography (GPC), wherein the $M_{n(GPC)}$ is greater than 28,000 g/mol;

a z-average molecular weight ($M_{z(GPC)}$) greater than 3,200,000 and less than or equal to 5,000,000 g/mol as measured using GPC; and a ratio of the ($M_{z(GPC)}$) to the $M_{w(GPC)}$ is from 8.5 to 10.5;

wherein the $M_{p(GPC)}$ is from 55,000 g/mol to 65,000 g/mol; and wherein the bimodal polyethylene composition is a polymerized reaction product of an ethylene monomer and at least one C3-C12 α-olefin comonomer.

2. The bimodal polyethylene composition of claim 1, wherein the $M_{w(GPC)}$ is greater than 380,000 g/mol.

3. The bimodal polyethylene composition of claim 1 having:

a secant modulus($E_s$) defined by the equation: $E_s$>−2,622+2,822×ρ+2.5×$MFR_5$, wherein $MFR_5$ is a ratio of the high load melt index ($I_{21}$) to a melt index ($I_5$) of the bimodal polyethylene composition measured according to ASTM D1238 at 190° C. and a 5.0 kg load;

a secant modulus ($E_s$) defined by the equation: $E_s$>−4,570.6+4,883×ρ+3.1×MWD;

or both.

4. The bimodal polyethylene composition of claim 1, wherein the $M_{w(GPC)}$ is from 380,000 g/mol to 500,000 g/mol.

5. The bimodal polyethylene composition of claim 1, wherein $MFR_5$ is from 20 to 32, wherein $MFR_5$ is a ratio of the high load melt index ($I_{21}$) to a melt index ($I_5$) of the bimodal polyethylene composition measured according to ASTM D1238 at 190° C. and a 5.0 kg load.

6. The bimodal polyethylene composition of claim 1, wherein the $M_{n(GPC)}$ is from greater than 28,000 g/mol and less than or equal to 40,000 g/mol.

7. The bimodal polyethylene composition of claim 1, wherein a secant modulus ($E_s$) of the bimodal polyethylene composition is greater than 965 MPa.

8. The bimodal polyethylene composition of claim 1, having an environmental stress-cracking resistance $F_{50}$ greater than 150 hours when measured according to ASTM D1693, Procedure B, 10% Igepal.

9. An article manufactured using the bimodal polyethylene composition of claim 1.

10. The article of claim 9, wherein the article is a blow molded article.

11. A method for producing the bimodal polyethylene composition of claim 1, comprising polymerizing via gas-phase polymerization ethylene and at least one $C_3$-$C_{12}$ α-olefin comonomer in the presence of a main catalyst and a trim catalyst in a single reactor to produce the bimodal polyethylene composition.

12. A bimodal polyethylene composition having:

a density ($\rho$) from 0.952 g/cm$^3$ to 0.957 g/cm$_3$ when measured according to ASTM D792-08, Method B;

a high load melt index ($I_{21}$) from 1.0 to 10 dg/min when measured according to ASTM D1238 at 190° C. and a 21.6 kg load;

a peak molecular weight ($M_{p(GPC)}$) defined by the equation: $M_{p(GPC)}$<−2,805.3×MWD+102,688, wherein MWD is a molecular weight distribution defined by the equation: MWD=$M_{w(GPC)}/M_{n(GPC)}$, $M_{w(GPC)}$ is a weight average molecular weight of the bimodal polymer composition, and $M_{n(GPC)}$ is a number average molecular weight of the bimodal polymer composition, and wherein $M_{p(GPC)}$, $M_{w(GPC)}$, and $M_{n(GPC)}$ are measured using gel permeation chromatography (GPC), wherein the $M_{n(GPC)}$ is greater than 28,000 g/mol a z-average molecular weight ($M_{z(GPC)}$) greater than 3,200,000 and less than or equal to 5,000,000 g/mol as measured using GPC;

a ratio of the ($M_{z(GPC)}$) to the $M_{w(GPC)}$ is from 8.5 to 10.5;

a secant modulus ($E_s$) defined by the equation: $E_s$>−2,622+2,822×ρ+2.5×$MFR_5$, wherein $MFR_5$ is a ratio of the high load melt index ($I_{21}$) to a melt index ($I_5$) of the bimodal polyethylene composition measured according to ASTM D1238 at 190° C. and a 5.0 kg load;

a secant modulus ($E_s$) defined by the equation: $E_s > -4,570.6 + 4,883 \times \rho + 3.1 \times MWD$;

or both.

13. The bimodal polyethylene composition of claim 12, wherein the $M_{p(GPC)}$ is from 55,000 g/mol to 65,000 g/mol.

14. The bimodal polyethylene composition of claim 12, wherein the $M_{w(GPC)}$ is greater than 380,000 g/mol.

15. A bimodal polyethylene composition having:

a density ($\rho$) from 0.952 g/cm$^3$ to 0.957 g/cm$^3$ when measured according to ASTM D792-08, Method B;

a high load melt index ($I_{21}$) from 1.0 to 10 dg/min when measured according to ASTM D1238 at 190° C. and a 21.6 kg load;

a peak molecular weight ($M_{p(GPC)}$) defined by the equation: $M_{p(GPC)} < -2,805.3 \times MWD + 102,688$, wherein MWD is a molecular weight distribution defined by the equation: $MWD = M_{w(GPC)}/M_{n(GPC)}$, $M_{w(GPC)}$ is a weight average molecular weight of the bimodal polymer composition, and $M_{n(GPC)}$ is a number average molecular weight of the bimodal polymer composition, and wherein $M_{p(GPC)}$, $M_{w(GPC)}$, and $M_{n(GPC)}$ are measured using gel permeation chromatography (GPC), wherein the $M_{n(GPC)}$ is greater than 28,000 g/mol a z-average molecular weight ($M_{z(GPC)}$) greater than 3,200,000 and less than or equal to 5,000,000 g/mol as measured using GPC; and a ratio of the ($M_{z(GPC)}$) to the $M_{w(GPC)}$ is from 8.5 to 10.5;

wherein a secant modulus ($E_s$) of the bimodal polyethylene composition is greater than 965 MPa.

16. The bimodal polyethylene composition of claim 15, wherein the bimodal polyethylene composition is a polymerized reaction product of an ethylene monomer and at least one C3-C12 α-olefin comonomer.

17. The bimodal polyethylene composition of claim 15, wherein the $M_{w(GPC)}$ is from 380,000 g/mol to 500,000 g/mol.

* * * * *